US009881023B2

(12) United States Patent
Mansour et al.

(10) Patent No.: US 9,881,023 B2
(45) Date of Patent: Jan. 30, 2018

(54) RETRIEVING/STORING IMAGES ASSOCIATED WITH EVENTS

(71) Applicant: Microsoft Technology Licensing, LLC, Redmond, WA (US)

(72) Inventors: Riham Hassan Abdel-Moneim Mansour, Cairo (EG); Mohamed Farouk Abdel-Handy, Cairo (EG); Hesham Saad Mohamed Abdelwahab El Baz, Alexandria (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 14/337,574

(22) Filed: Jul. 22, 2014

(65) Prior Publication Data

US 2016/0026656 A1   Jan. 28, 2016

(51) Int. Cl.
| | |
|---|---|
| *G06K 9/54* | (2006.01) |
| *G10L 15/00* | (2013.01) |
| *G06F 17/30* | (2006.01) |
| *G10L 15/183* | (2013.01) |

(52) U.S. Cl.
CPC .. *G06F 17/30247* (2013.01); *G06F 17/30017* (2013.01); *G06F 17/30023* (2013.01); *G06F 17/30265* (2013.01); *G06F 17/30554* (2013.01); *G06F 17/30598* (2013.01); *G06F 17/30684* (2013.01); *G06F 17/30705* (2013.01); *G06F 17/30976* (2013.01); *G10L 15/183* (2013.01)

(58) Field of Classification Search
CPC ......... G06F 17/30244; G06F 17/30253; G06F 17/30256; G06F 17/30268; G06F 17/30277; G06F 17/30312; G06F 17/30976; G01L 15/183; G01L 15/197
USPC .................................. 382/305; 704/235, 255
See application file for complete search history.

(56) References Cited

U.S. PATENT DOCUMENTS

| | | | | |
|---|---|---|---|---|
| 6,052,657 A | * | 4/2000 | Yamron | ............ G06F 17/30616 704/257 |
| 6,810,146 B2 | * | 10/2004 | Loui | ................. G06F 17/30265 382/173 |
| 7,035,789 B2 | * | 4/2006 | Abrego | ................. G10L 15/197 704/1 |
| 8,589,488 B2 | | 11/2013 | Huston et al. | |

(Continued)

OTHER PUBLICATIONS

Voutilainen, Atro. "Part-of-speech tagging." The Oxford handbook of computational linguistics (2003): 219-232.

(Continued)

*Primary Examiner* — Kanjibhai Patel

(57) ABSTRACT

Retrieving and/or storing images associated with events is described. For example, streams of event data comprising text are analyzed to detect an event and a language component builds an event language model for the event, comprising a plurality of words. In various examples, images extracted from web or other sources have associated text. In examples, images with associated text that is similar to the event language model are identified as images of the event. In various examples, associations between images and events are used to update an image retrieval system and/or an image storage system. In various examples, query terms about an event are received at an image retrieval system which returns images related to the event on the basis of associations between image text and event language models.

20 Claims, 8 Drawing Sheets

(56) References Cited

U.S. PATENT DOCUMENTS

| | | | |
|---|---|---|---|
| 8,612,441 B2* | 12/2013 | Wood | G06F 17/30247 705/342 |
| 8,644,859 B2 | 2/2014 | Hyung et al. | |
| 9,009,025 B1* | 4/2015 | Porter | G10L 15/063 704/246 |
| 9,043,205 B2* | 5/2015 | Mengibar | G10L 15/265 704/231 |
| 2011/0196888 A1 | 8/2011 | Hanson et al. | |
| 2013/0239049 A1 | 9/2013 | Perrodin et al. | |
| 2013/0262588 A1 | 10/2013 | Barak et al. | |
| 2013/0317912 A1 | 11/2013 | Bittner | |
| 2014/0085329 A1 | 3/2014 | Codella et al. | |
| 2014/0108528 A1 | 4/2014 | Papakipos et al. | |
| 2014/0152854 A1 | 6/2014 | Iwaki et al. | |
| 2014/0201227 A1 | 7/2014 | Hamilton-Dick et al. | |

OTHER PUBLICATIONS

Becker et al. "Beyond Trending Topics: Real-world event identification on Twitter" 2011 Proceedings of the fifth international AAAI conference on weblogs and social media.

Ponte et al. "A language modeling approach to information retrieval" 1998 ACM, Inc.

Chen et al "Event detection from Flickr data through wavelet-based spatial analysis" 2009 Proceedings of the 2009 ACM CIKM International Conference on Information and Knowledge Management.

"International Search Report & Written Opinion for PCT Patent Application No. PCT/US2015/041432", Mailed Date: Oct. 15, 2015, filed Date: Jul. 22, 2015, 11 Pages.

Liu et al., "Event Representation and Visualization from Social Media", Dec. 13, 2013, Advances in Communication Networking: 20th EUNICE/IFIP EG 6.2, 6.6 International Workshop, Rennes, France.

Bao et al., "Multimedia news digger on emerging topics from social streams", Proceedings of the 20th ACM International Conference on Multimedia, MM '12, Oct. 29, 2012.

Second Written Opinion Issued in PCT Application No. PCT/US2015/041432, Dated: Jun. 28, 2016, 5 Pages.

"International Preliminary Report on Patentability Issued in PCT Application No. PCT/US2015/041432", Dated: Oct. 28, 2016, 7 Pages.

\* cited by examiner

RETRIEVING/STORING IMAGES ASSOCIATED WITH EVENTS

BACKGROUND

Image retrieval is typically achieved by tagging the images with text and then using text based document retrieval methods to find images relevant to query words entered by a user. Other approaches, based on analyzing the content of images automatically are more complex.

As the availability of image files on the internet and from other sources is continually increasing there is an ongoing need for efficient and effective image retrieval systems.

The embodiments described below are not limited to implementations which solve any or all of the disadvantages of known image retrieval systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Retrieving and/or storing images associated with events is described. For example, streams of event data comprising text are analyzed with machine learning to detect an event and an event language model is built for the event, comprising a plurality of words. In various examples, images extracted from web or other sources have associated text. In examples, images with associated text that is similar to the event language model are identified as images of the event. In various examples, associations between images and events are used to update an image retrieval system and/or an image storage system. In various examples, query terms about an event are received at an image retrieval system which returns images related to the event on the basis of associations between image text and event language models.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
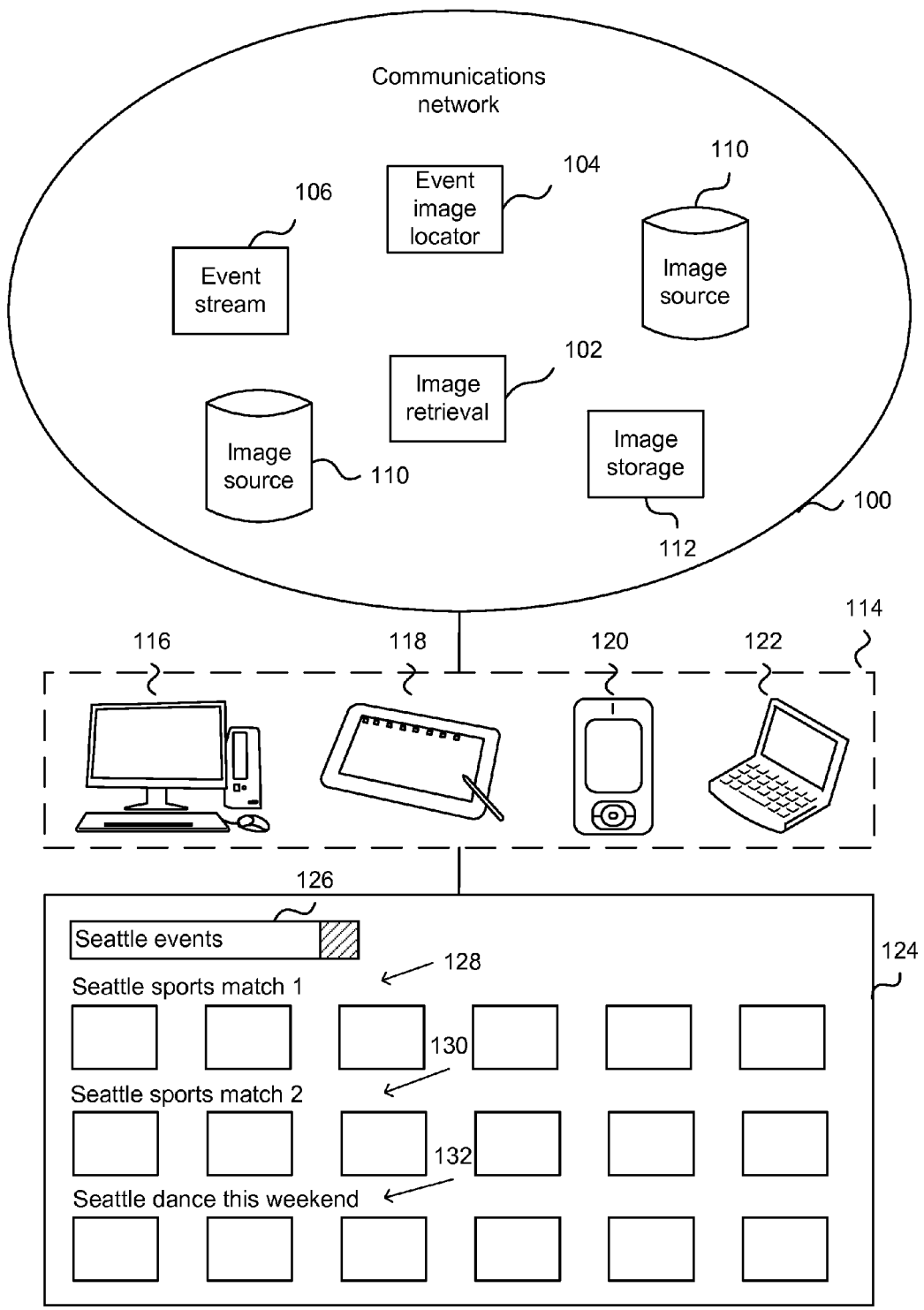
FIG. 1 is a schematic diagram of an image retrieval system used to retrieve images about events, and also of an image storage system.

FIG. 1 is a schematic diagram of an image retrieval system 102 used to retrieve images 128, 130, 132 about events, and also of an image storage system 112. An end user device 114 such as a personal computer 116, tablet computer 118, mobile phone 120, laptop 122 or other end user device is able to communicate with the image retrieval system 102 and/or image storage system 112 to enable an end user to retrieve and/or store images about events. In the example of FIG. 1 a graphical user interface display 124 at the end user device is shown. An end user has entered the query term "Seattle events" into a search box and three rows of results are shown, each row showing images of an individual event and having a key phrase about the event displayed as a title. In this example, a row 128 of five images related to an event with the key phrase "Seattle sports match 1" are shown; a second row 130 of five images related to an event with the key phrase "Seattle sports event 2" and a third row 132 of five images related to an event with the key phrase "Seattle dance this weekend". Previous approaches to image retrieval have not been able to find images relating to particular events in this manner.

The image retrieval system 102 and/or the image storage system 112 are located at a communications network 100 such as the interne, an intranet or any other communications network accessible to end user device 114. Also available at the communications network 100 are an event image locator 104, one or more image sources 110 and one or more event streams 106. The image sources 110 are databases or other stores of images such as photographs, videos, medical images, depth images, or other types of images. One or more of the image sources may be image community web sites. The event stream 106 is computer implemented and outputs a stream of event data such as text items, for example where a text item is a message having 140 characters or less. The event stream 106 may be a steam of social media text messages. In some examples the text items in the event stream have associated uniform resource locators (URLs).

The event image locator 104 is computer implemented and is able to communicate, using the communications network 100, with the event stream 106, image sources 110, image retrieval system 102 and image storage system 112 either by receiving input and/or sending output to those entities. The event image locator 104 acts to detect events in the event stream 106, optionally in real time. The event image locator is arranged to find images from the image sources 110 that are similar to an event model of a detected event and to use the found images, to improve the image retrieval system 102 and/or to improve the image storage system 112. An event model is a plurality of words observed in or related to event data. In examples an event model is a histogram of frequencies of words observed in or related to event data. In some examples the event model is a unigram language model. In some examples the event model is a multinomial probability distribution over a vocabulary of words. The event image locator 104 is described in more detail below with reference to FIG. 2.

The image retrieval system 102 is computer implemented and comprises an index of images. In some examples the images have been located using a web crawler or other means. The image retrieval system 102 comprises a ranking algorithm arranged to apply query terms to the index so as to output a ranked list of images.

The image storage system 112 is a database or other store which holds images together with associated event data. The associated event data may comprise an event model, a time interval or other time data, location data.

The functionality of the event image locator described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs).

Figure 2:
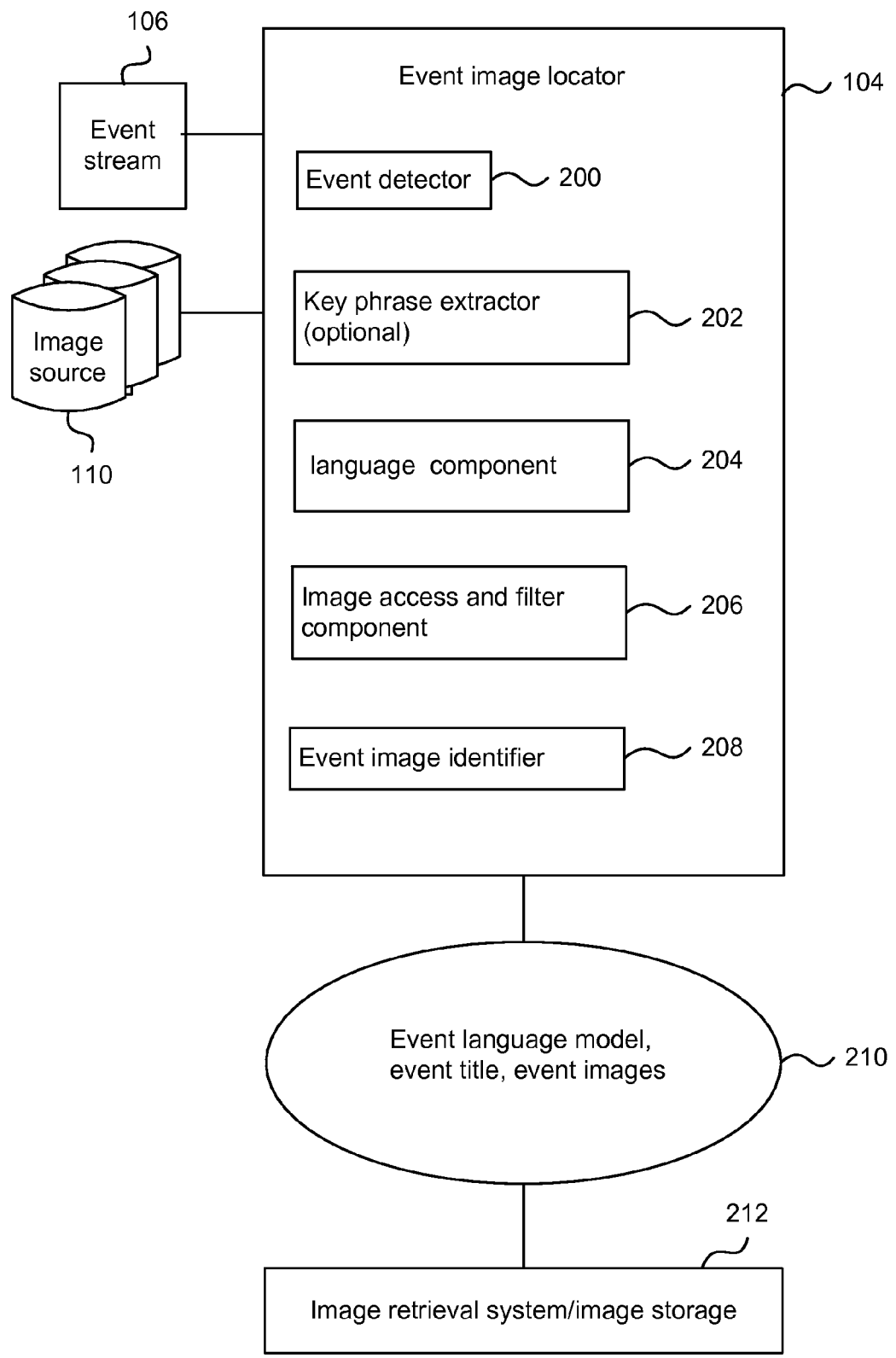
FIG. 2 is a schematic diagram of the event image locator of FIG. 1 in more detail.
Figure 3:
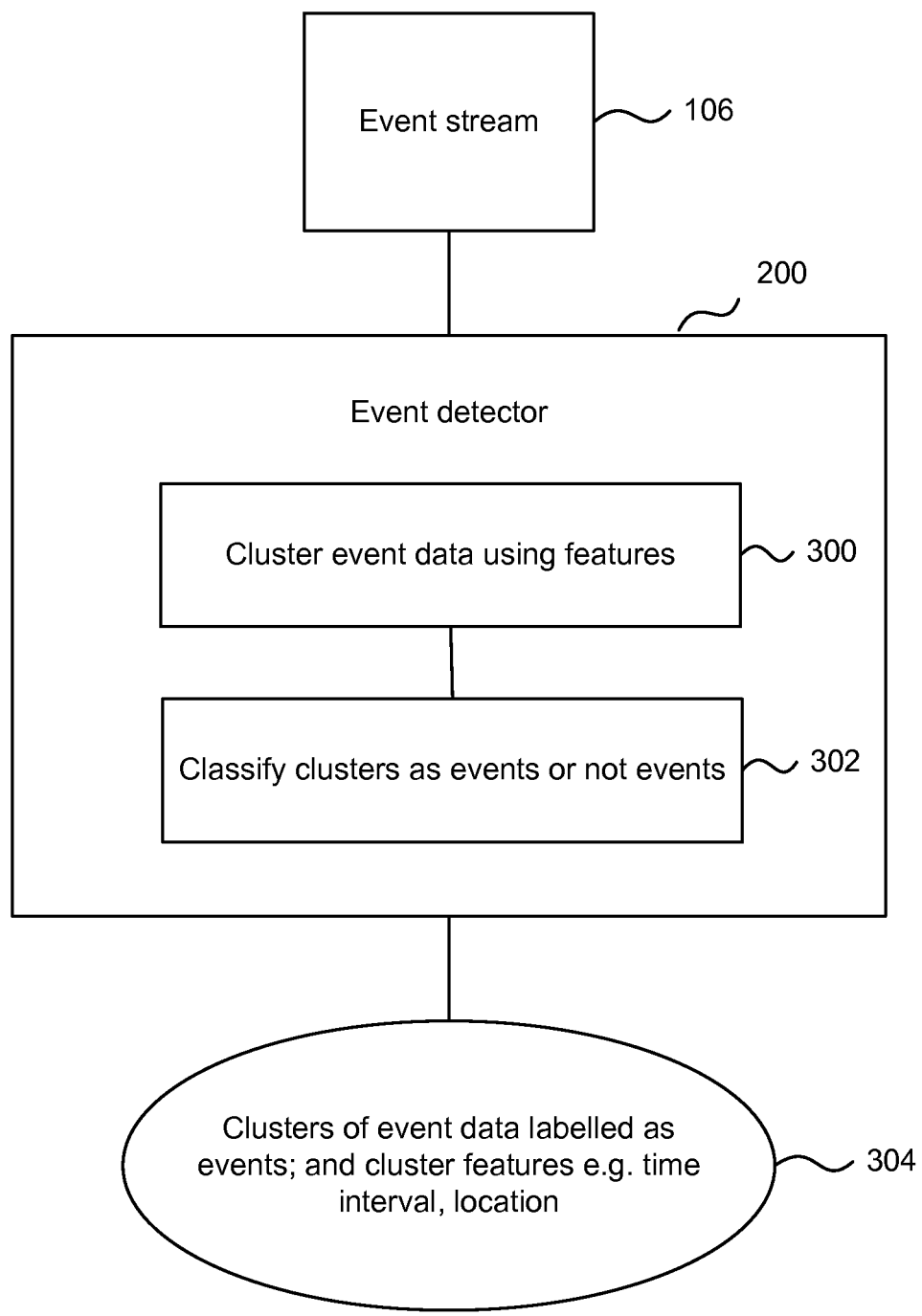
FIG. 3 is a flow diagram of a method at the event detector of FIG. 2.
Figure 4:
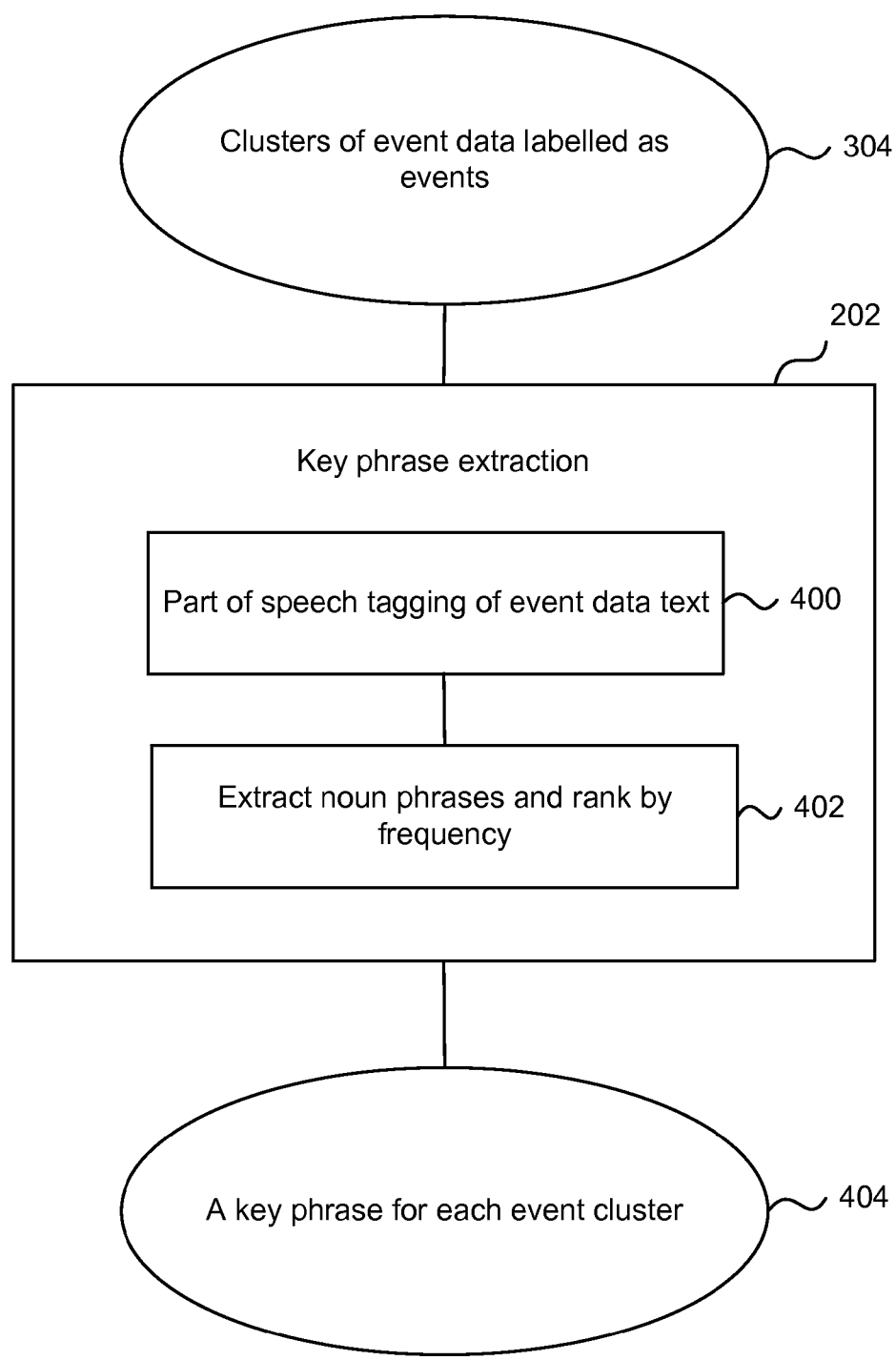
FIG. 4 is a flow diagram of a method at the key phrase extraction component of FIG. 2.

FIG. 2 is a schematic diagram of the event image locator of FIG. 1 in more detail. The event image locator 104 receives input from event stream 106 and from one or more image sources 110. The event image locator 104 comprises an event detector 200, an optional key phrase extractor 202, a language component 204, an image access and filter component 206 and an event image identifier 208.

In some examples the stream of text data items is a social media stream and the images are identified in real time according to a rate of the stream of text data items.

The event image locator outputs, for individual events identified in the event stream 106, an event language model, an optional event title, and event images 210. The information from the event image locator 104 is made available to an image retrieval system 212 and/or image storage system.

The event detector 200 is arranged to detect events in the event stream 106, optionally in real time. As mentioned above, the event stream comprises event data items such as text messages of 140 characters optionally also with URLs. The event data items may originate from many different sources, such as individuals operating end user equipment in different locations. The individuals have given their consent for the event data items to be used. The event data items may be received at one or more entities in communications network 100 and made available as event stream 106. The event data items may have time stamps. The event data items may have locations, such as locations of a sender of the event data item. Any private data in the event data items, such as sender information, is either omitted from the event stream 106 or is aggregated. Sender location information is scaled so as not to reveal a location of the sender which could identify the sender.

The event detector 200 clusters 300 the stream of event data using features of the event data items. These features may be any of: textual features, temporal features, location features. The clustering may be achieved using any online incremental clustering technique.

The resulting clusters are then classified 302 as being events or not events. The classification is done using a machine learning classifier which is trained in advance using ground truth data. For example, the classifier may be a support vector machine, neural network, random decision forest or other type of classifier. The ground truth data comprises features extracted from clusters of event data items where the clusters are known to relate to real events.

At test time, a new cluster which is to be classified as an event or not an event, is obtained and features are extracted from the cluster. The features are input to the classifier which calculates the output as event or not an event. The features may be any one or more of:

Number of unique words in the cluster

Number of emoticons in the cluster

Number of unique hashtags in the cluster

Frequency of event data items in time stamp bins in the cluster

Number of event data items in the most frequent time stamp bin divided by the total number of event data items in the cluster Standard deviation of histogram of event data items by time stamp bin Longest non-zero timespan over which event data items are observed in the cluster Number of occurrences of the symbol @ in the event data items of the cluster Number of URLs in the event data items of the cluster Number of event data items in the cluster which are previous event data items that have been forwarded Average similarity of event data items to the centroid of the cluster Number of event data items in the cluster Number of duplicate event data items in the cluster Of these features the following have been found to give significant gains in the overall accuracy of the event classifier:

Number of event data items in the most frequent time stamp bin divided by the total number of event data items in the cluster This feature, referred to as a peak density feature, is useful for discriminating between events and non events. For example, consider a soccer match where one team scores a goal in the final hour of the match. Event data items are instant at the time of the goal and then occur again after two minutes. The peak density feature enables this type of characteristic, where a cluster has more peaks of event data items, to be used to identify events.

Standard deviation of histogram of event data items by time stamp bin

This standard deviation feature has not been used before to classify clusters as being events or not events. Where standard deviation is smaller this has been found to be a good indicator of an event.

Longest non-zero timespan over which event data items are observed in the cluster.

This feature has been found to be a good identifier of clusters which are events, because clusters which are events are more likely to comprise event data items where the non-zero time span is short.

Average similarity of event data items to the centroid of the cluster. This feature has been found a good indicator because if there are lots of outlier event data items, then the cluster is more likely to represent data that is not from an event.

The event detector 200 outputs the clusters 304 of event data items which are labeled as events. Cluster features are also output such as time interval, location or others of the features mentioned above.

In some examples a key phrase extraction component is used, although this is optional. The key phrase extraction component 202 takes as input clusters 304 of event data items which are labeled as events. The key phrase extraction component carries out part of speech tagging 400 of the event data items. The part of speech tagging labels words in the event data items as being nouns, verbs, adverbs or other parts of speech. The part of speech tagging is carried out by an automated system using technology such as described in Voutilainen, Atro. "Part-of-speech tagging." The Oxford handbook of computational linguistics (2003): 219-232.

Using output from the part of speech tagging 400 the key phrase extraction component 202 extracts noun phrases from the event data items. For example, this is done using rules applied to the tagged event data items. The noun phrases are ranked 402 by frequency of occurrence in the cluster. One of the noun phrases is selected from the ranking, using rules or other criteria, and this noun phrase is the key phrase, or title, for the cluster (referred to as an event cluster because it has already been classified as being about an event). The key phrase extraction component 202 outputs a key phrase 404 for each event cluster. In the example of FIG. 1 key phrases are shown in the graphical user interface.

Figure 5:
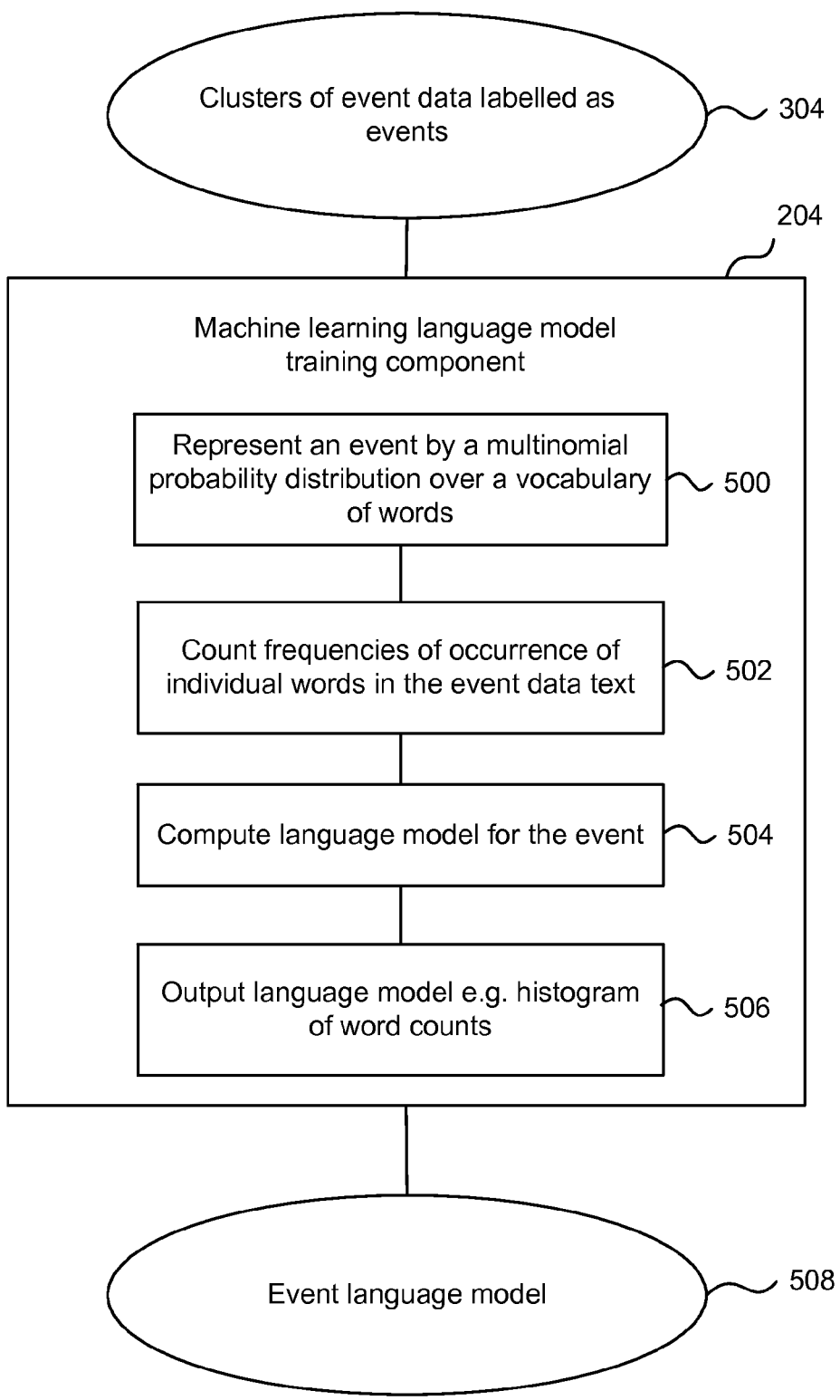
FIG. 5 is a flow diagram of a method at the language component of FIG. 2.

FIG. 5 is a flow diagram of a method at the language component 204 of FIG. 2. This component receives event clusters 304 as input and calculates an event language model 508 for each event cluster. It represents 500 an event by a multinomial probability distribution over a vocabulary of words. This multinomial probability distribution is an example of an event language model. For example, the probability distribution may be in the form of a histogram of frequencies of word counts in the event data items in the cluster. Thus an event language model can be a plurality of words such as the top n most frequent words from the histogram. In some examples the words are assumed to be independent of one another and in this case the event language model is a unigram language model. An example of a unigram language model that may be used is:

$$P(T|E) = \Pi_{i=1}^{|T|} P(w_i|E)$$

Which may be expressed in words as, the probability of textual annotation T of an image from an image source, given an event E, is equal to the product of the event cluster frequency counts of the number of words in the textual annotation. For example, if a textual annotation of an image has 3 words in it, then the unigram model can be used to compute a likelihood that the three words will be a particular set of three words, by computing a product of the frequency counts of the three words from the event cluster.

The language model component 204 counts 502 frequencies of occurrence of individual words in the event data text. It computes 504 an event language model for the event such as the above unigram language model. For example, it may output the event language model in the form of a histogram of word counts for words in the event cluster.

The language component 204 may use the event language model to compute a most likely textual annotation from the event cluster (where it knows the number of words that are to be in the textual annotation).

It uses the language model to compute a most likely textual annotation.

Figure 6:
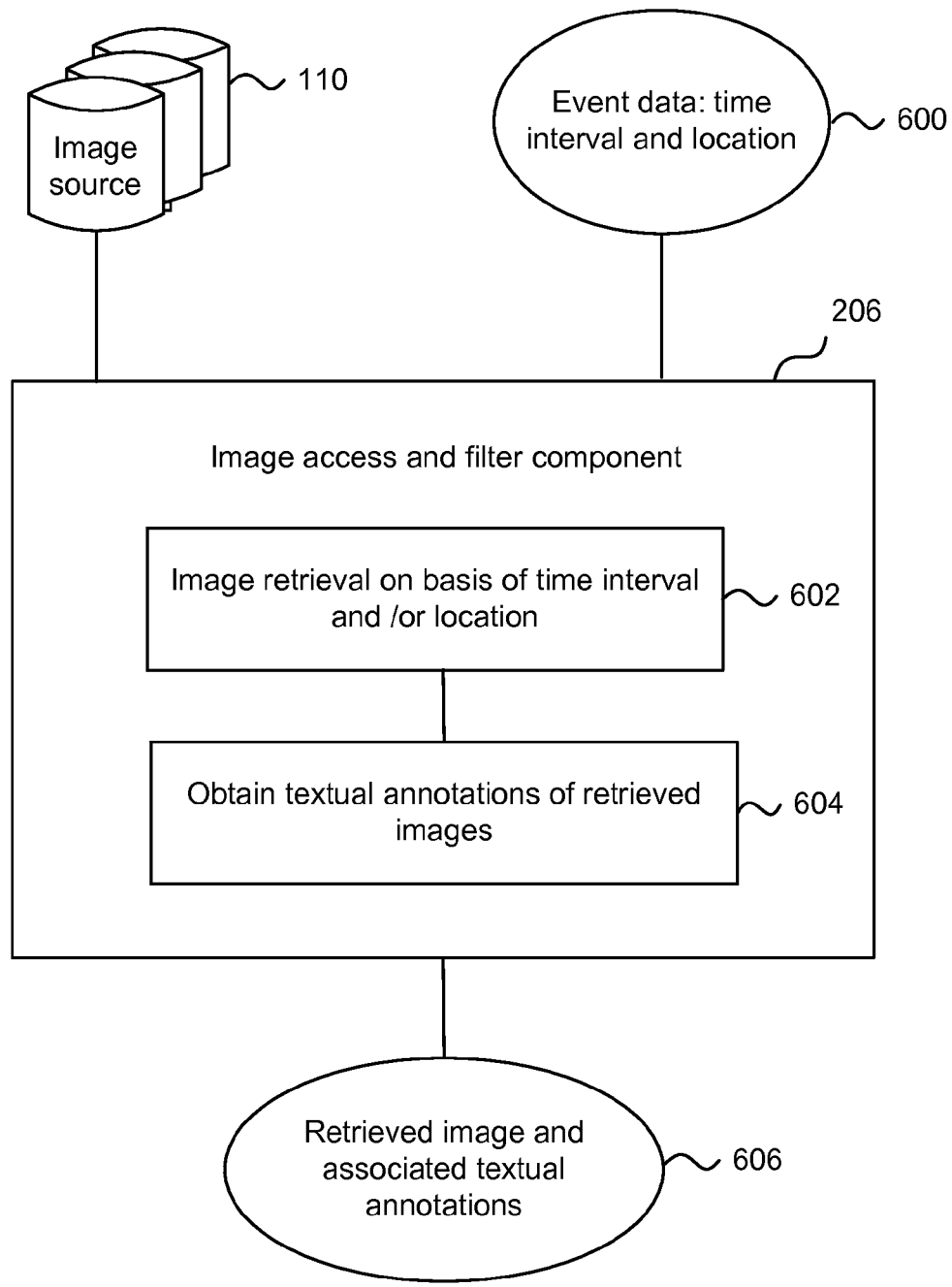
FIG. 6 is a flow diagram of a method at the image access and filter component of FIG. 2.

FIG. 6 is a flow diagram of a method at the image access and filter component 206 of FIG. 2. This component has access to image sources 110 as described above. It takes as input event data 600 such as a time interval for an event and/or location data for the event. The location data can be a geographical place name, global positioning system data, geographical coordinates, or other geographical location data.

Using the time interval and/or location data, the image access and filter component retrieves images from one or more of the sources 110. For example, it may issue a query to a social media image source and/or to a remote document storage location. The query comprises the time interval and/or location data. In response to the issued query, the image access and filter component receives addresses, identifiers, links or other references to images which are relevant to the query. The references to the images may be ranked in terms of their relevance to the query. Together with the references, metadata about the images may be returned to the image access and filter component. The metadata may comprise any one or more of: textual annotations, time data, geographical location data.

The image access and filter component 206 obtains 604 textual annotations of the retrieved images. This is achieved in some cases by receiving the textual annotations from the image source together with the references to the images. In some examples, the textual annotations are actively sought by the image access and filter component. For example, by accessing a web page comprising one of the referenced images, and taking text from that web page to form the textual annotation. Rules, templates or other criteria may be used to select which text to extract from the web page. For example, titles associated with the image, anchor text associated with the image, or other text at or near the image in the web page.

The image access and filter component may comprise one or more filters to remove any images identified as being spam, noise, or having inappropriate content.

The image access and filter component outputs, for each of the images it identifies, a reference to the retrieved image and the textual annotation(s) associated with the image.

Figure 7:
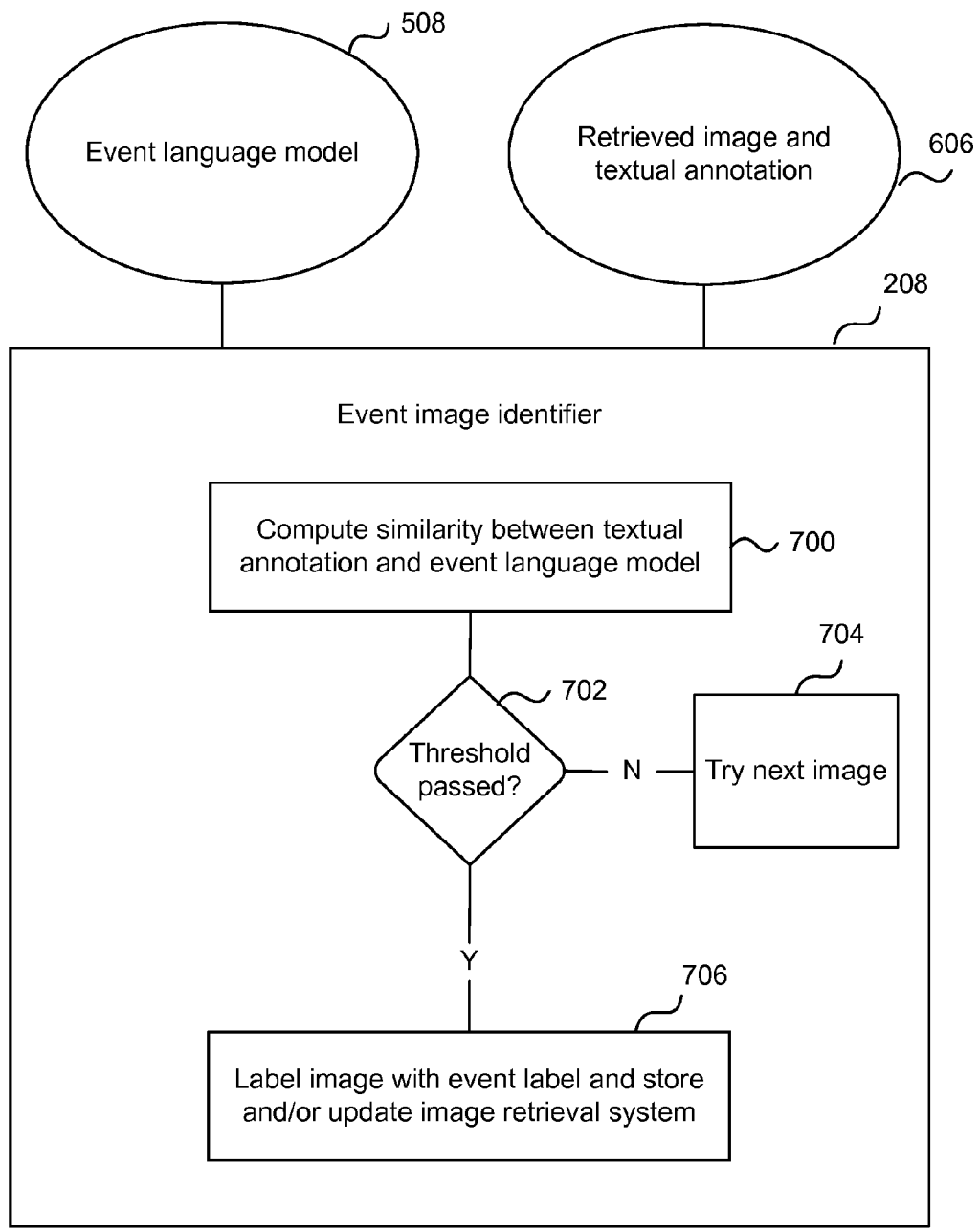
FIG. 7 is a flow diagram of process at the event image identifier of FIG. 2.

FIG. 7 is a flow diagram of process at the event image identifier 208 of FIG. 2. This component takes as input an event language model 508 for an event, and a reference to a retrieved image 606 and its associated textual annotation from the image access and filter component. The reference to a retrieved image 606 has been obtained using a time interval and/or location for the event.

The event image identifier computes 700 a similarity between the textual annotation and the event language model. For example, by counting the number of words in the textual annotation and in the event language model which are the same, or which have similar meanings.

If the similarity is below a threshold then the next image is tried 704. If the similarity is above a threshold 702 the referenced image is labeled with a label for the event. In some examples, the referenced image is stored together with the label for the event. In some examples an image retrieval system is updated with the information about the association between the referenced image and the event label. For example, by updating an index of documents at an image retrieval system. A ranking algorithm may be applied to the updated index, where the ranking algorithm takes into account the event label data.

In some examples, the information about the association between the referenced image and the event label is stored for use in a two part image retrieval process. For example, a conventional image retrieval system is used to obtain images relevant to an event query, such as "Seattle events". The resulting ranked list of images is then re-ranked using the information about the association between the referenced image and the event label.

The event image identifier 208 operates on more image references retrieved by the image access and filter component by repeating the method of FIG. 7.

Figure 8:
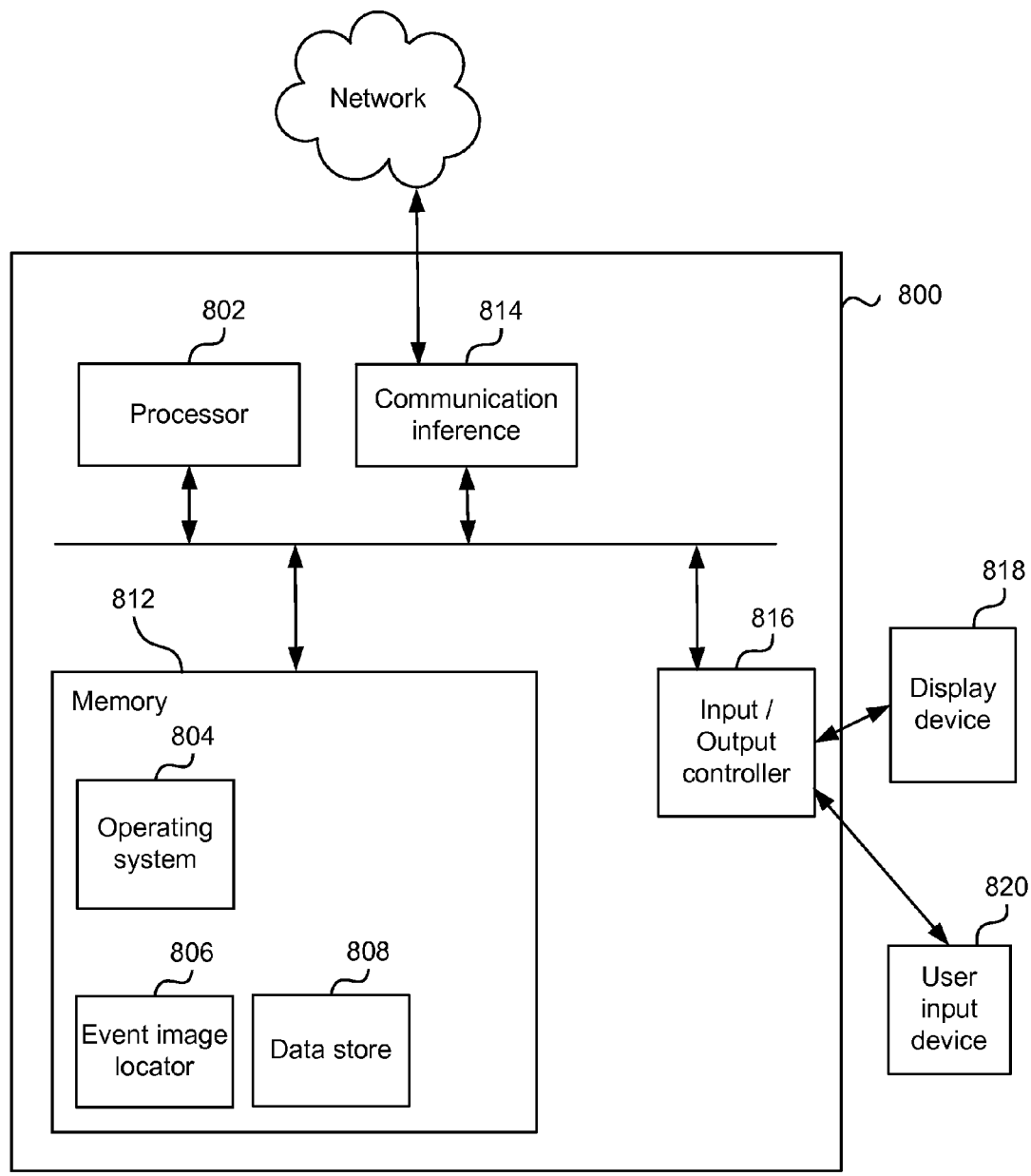
FIG. 8 illustrates an exemplary computing-based device in which embodiments of an image storage system/and or image retrieval system may be implemented.

FIG. 8 illustrates various components of an exemplary computing-based device 800 which may be implemented as any form of a computing and/or electronic device, and in which embodiments of an event image locator may be implemented. The event image locator may be part of an image retrieval system 102 implemented using the computing based device 800 in some examples.

Computing-based device 800 comprises one or more processors 802 which may be microprocessors, controllers or any other suitable type of processors for processing computer executable instructions to control the operation of the device in order to locate images related to events and/or to enable image retrieval by events. In some examples, for example where a system on a chip architecture is used, the processors 802 may include one or more fixed function blocks (also referred to as accelerators) which implement a part of the method of any of FIGS. 3-7 in hardware (rather than software or firmware). Platform software comprising an operating system 804 or any other suitable platform software may be provided at the computing-based device to enable application software to be executed on the device. An event image locator 806 may be provided as described with reference to FIG. 2. A data store 808 holds images, references to images, time intervals, thresholds, rules, geographical location data, ranked lists of images, and other data.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814).

The computing-based device 800 also comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface (NUI). This user input may be used to set threshold values, input rules, specify image sources to be accessed, view ranked lists of images, or for other purposes. In an embodiment the display device 818 may also act as the user input device 820 if it is a touch sensitive display device. The input/output controller 816 may also output data to devices other than the display device, e.g. a locally connected printing device.

Any of the input/output controller 816, display device 818 and the user input device 820 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example, a method of locating images depicting events is described. The method comprising:

detecting, at a processor, an event from a stream of text data items;

triggering a language component using the detected event to build an event language model comprising a plurality of words formed from the text data items; and identifying images from one or more sources using the event language model.

In this way, images depicting events are located in a fast, efficient manner. The images are located as the events are detected, making the results continually up to date.

For example, detecting the event comprises computing a plurality of text data items from the stream which are associated with the event, and wherein the event language model is a histogram of frequencies of occurrence of words in the plurality of the text data items. By computing an event language model for each event, the results can be bespoke for each event. By using a histogram of frequencies of occurrence of words the event language model can be simply and efficiently computed on-the-fly.

In an example the event language model is a unigram language model. By using a unigram language model a simple and yet effective event language mode is obtained.

In an example detecting the event comprises computing a plurality of text data items from the stream which are associated with the event, and wherein the event language model is the top n ranked words by frequency of occurrence in the plurality of the text data items. By using the top n ranked words the event language model is particularly concise, saving storage and transmission costs, and yet still effective.

In an example, identifying images from the one or more sources comprises obtaining textual annotations of the identified images. For example, the textual annotations may be category tags or keywords added by a human or automated system which analyses the content of the images, and/or uses context data.

In an example, obtaining the textual annotation comprises accessing a web page from which an identified image originates. This enables textual annotations to be automatically computed in an accurate manner.

In an example, identifying one of the identified images comprises computing a similarity between a textual annotation of the image and the event language model. Computing a similarity is a fast and effective way of finding which event an image is likely to depict.

In an example, computing the similarity comprises comparing identity and/or semantic meaning of words in the textual annotation and the event language model. This enables similarity to be computed in an accurate manner.

In an example, the stream of text data items is a social media stream and the images are identified in real time according to a rate of the stream of text data items. This enables the results to be continually up to date.

In examples, detecting an event from the stream of text data items comprises clustering the text data items to produce a plurality of clusters and using a classifier to classifying the clusters as being event clusters or not event clusters; and wherein the classifier uses one or more of the following features: number of event data items in a most frequent time stamp bin divided by a total number of event data items in the cluster, standard deviation of histogram of event data items by time stamp bin, longest non-zero timespan over which event data items are observed in the cluster, average similarity of event data items to a centroid of the cluster. These features for classifying clusters as being event clusters or not are new and have been found particularly effective.

In various examples, a method of image retrieval comprises:

receiving one or more query terms relating to an event; and accessing images from one or more image sources using data associated with the images and using the query terms, at least some of the data being from an event language model of the event, the event language model being a plurality of words formed from a stream of text data items from which the event has been detected.

In various examples, an event image locator comprises:
at least one processor adapted to execute stored instructions; and
a memory comprising code configured to:
detect an event from a stream of social media text items;
trigger a language component using the detected event to build an event language model comprising a plurality of words formed from the social media text items; and
identify images from one or more social media sources using the event language model.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
monitoring, by a processor, a plurality of data sources that make streams of data available for access via a network available to the processor, the streams of data including a stream of text data items;
detecting, by the processor, an event from the stream of text data items;
based on the detecting, triggering, by the processor, a language component using the detected event to build an event language model by the processor, the event language model comprising a plurality of words formed from the text data items; and
retrieving, by the processor via the network, an image from one or more of the plurality of data sources, based at least in part on the event language model.

2. The method of claim 1 wherein detecting the event comprises computing a plurality of text data items from the stream which are associated with the event, and wherein the event language model is a histogram of frequencies of occurrence of words in the plurality of the text data items.

3. The method of claim 1 wherein the event language model is a unigram language model.

4. The method of claim 1 wherein detecting the event comprises computing a plurality of text data items from the stream which are associated with the event, and wherein the event language model is the top n ranked words by frequency of occurrence in the plurality of text data items.

5. The method of claim 1 wherein retrieving the image from the one or more data sources comprises obtaining textual annotations of the retrieved image.

6. The method of claim 5 wherein obtaining the textual annotation comprises accessing a web page from which the retrieved image originates.

7. The method of claim 6 wherein retrieving the image comprises identifying the image based at least in part on computing a similarity between a textual annotation of the image and the event language model.

8. The method of claim 7 wherein computing the similarity comprises comparing identity and/or semantic meaning of words in the textual annotation and the event language model.

9. The method of claim 1 wherein: the stream of text data items is a social media stream, the retrieved image is a first image retrieved of a plurality of retrieved images retrieved based at least in part on the event language model, and the plurality of retrieved images are retrieved in real time according to a rate of the stream of text data items.

10. The method of claim 1 wherein: detecting an event from the stream of text data items comprises: clustering the text data items to produce a plurality of clusters, and using a classifier to classify the clusters as being event clusters or not event clusters; and the classifier performs the detection based at least in part on one or more of: number of event data items in a most frequent time stamp bin divided by a total number of event data items in the cluster, standard deviation of histogram of event data items by time stamp bin, longest non-zero timespan over which event data items are observed in the cluster, average similarity of event data items to a centroid of the cluster.

11. A method of image retrieval comprising:
receiving one or more query terms at a processor, the query terms relating to an event;
accessing an event language model associated with the event stored in memory accessible to the processor, the event language model including one or more of words or syntax formed from a stream of text data items and classified by a machine classifier as being associated with the event; and
accessing, by the processor over a network accessible to the processor, images available over the network from one or more image sources using data associated with the images and using the query terms, at least some of the data associated with the images corresponding to at least a portion of the event language model of the event.

12. An event image locator comprising:
a processor;
a communication interface communicatively coupling the processor to a network; and
a memory storing and processor-executable instructions that, when executed by the processor, configure the processor to:
monitor a stream of social media text items available to the processor via the network;
cluster one or more of at least a portion of the stream of social media text items or attributes of the portion of the stream of social media text items into a cluster;
classify, by execution of a classifier, the cluster as being associated with an event;
build an event language model based at least in part on the cluster, the event language model comprising one or more of a plurality of words formed from the cluster or attributes of the cluster; and
retrieve, via the network, images from one or more social media sources using the event language model.

13. The event image locator of claim 12, wherein detecting the event comprises computing a plurality of text data items from the stream which are associated with the event, and wherein the event language model is a histogram of frequencies of occurrence of words in the plurality of the text data items.

14. The event image locator of claim 12 wherein the event language model is a unigram language model.

15. The event image locator of claim 12 wherein detecting the event comprises computing a plurality of text data items from the stream which are associated with the event, and wherein the event language model is the top n ranked words by frequency of occurrence in the plurality of text data items.

16. The event image locator of claim 12 wherein retrieving images from the one or more sources comprises obtaining textual annotations of the retrieved images.

17. The event image locator of claim 16 wherein obtaining the textual annotation comprises accessing a web page from which a retrieved image originates.

18. The event image locator of claim 1, the processor further configured to identify images for retrieval based at least in part on computing a similarity between a textual annotation of the image and the event language model.

19. The event image locator of claim 12 wherein: classifying the event from the stream of text data items comprises: clustering the text data items to produce a plurality of clusters, and using the classifier to classify the clusters as being event clusters or not event clusters; and the classifier performs the classification based at least in part on one or more of: number of event data items in a most frequent time stamp bin divided by a total number of event data items in the cluster, standard deviation of histogram of event data items by time stamp bin, longest non-zero timespan over which event data items are observed in the cluster, or average similarity of event data items to a centroid of the cluster.

20. The event image locator of claim 12 being at least partially implemented using hardware logic selected from any one or more of: a field-programmable gate array, an application-specific integrated circuit, an application-specific standard product, a system-on-a-chip, or a complex programmable logic device.

* * * * *